May 21, 1968  A. C. BORDELON ET AL  3,384,422
GRAIN TRIMMING MACHINE

Filed Oct. 4, 1966  2 Sheets-Sheet 1

INVENTORS
Albert C. Bordelon, &
BY  Nelvin J. Luke
Wolf, Greenfield & Hicken

May 21, 1968  A. C. BORDELON ET AL  3,384,422

GRAIN TRIMMING MACHINE

Filed Oct. 4, 1966  2 Sheets-Sheet 2

INVENTOR
Albert C. Bordelon, &
BY Nelvin F. Luke
Wolf, Greenfield & Hieken

United States Patent Office 3,384,422
Patented May 21, 1968

3,384,422
GRAIN TRIMMING MACHINE
Albert C. Bordelon, 534 Honore Drive, and Nelvin F. Luke, 808 Canton St., both of New Orleans, La. 70121
Filed Oct. 4, 1966, Ser. No. 584,199
4 Claims. (Cl. 302—28)

ABSTRACT OF THE DISCLOSURE

A portable trimming machine for handling bulk grain as in loading grain on ships and other vehicles of transport is provided having a hopper defining outlet means and a support removably mounting the hopper. A plurality of elongated flexible conduits are connected to the outlet means and the conduits have a plurality of venturi means located at spaced intervals therealong. Each of the venturi means of the conduits are connected with a gas pressure supply line to create a forward force on bulk grains passing through the conduits and a compressor is spaced from the hopper and acts to pass gas under pressure into the gas supply lines.

---

Bulk grains have been transported by ship for many, many years and increasing usage of shipboard transportation has been made in recent years. Surprisingly there are still many problems involved in loading such grain and with the safety precautions necessary when such grains are transported over sea by ship.

The problems mostly arise because bulk grains cannot be treated nor do they behave as liquids. Thus, when bulk grains are placed in the holds or storage compartments of ships, the grain piles do not automatically level off at the surface. Beams, corners and pipes frequently cause creation of voids and uneven surfaces in piles of grain positioned in storage compartments and holds of ships. Such uneven surface distribution can cause problems in listing of ships. Moreover, if void spaces occur, shifting of the bulk grains in transit as during rough seas can cause listing of the carrying ships due to uneven weight distribution on either side of the center line of the ships. This can create serious safety hazards as is well known to the marine industry.

In the past, it has been customary to trim bulk grain loaded in ships' holds by the use of small bulldozers, belt-driven machines and/or hand shoveling to level off the grain and fill all void spaces in the compartments or holds in which they are carried. However, there are several inherent problems in using small bulldozers, belt-driven machines and/or hand shoveling. For example, often, the compartments of tank vessels are divided into twenty-seven or more tanks each of which must be separately trimmed causing considerable loss of time and resultant expense. The covers of conventional storage tanks for bulk grains are often on the order of 2½ feet in diameter with smaller Butterworth holes being provided for cleaning of the tanks without the necessity of opening the large or "big top" openings. The small openings preclude the use of many trimming machines hereto suggested such as small bulldozers and belt-driven machines. Thus, even the use of bulldozers or belt-driven machines for trimming is often eliminated as a practical matter and hand shoveling must be used.

In addition to the trimming problem, other problems occur in loading vessels with bulk grains, for example, many tank vessels have 27 or more tanks each having openings at different locations along the vessel. Many shore based loading facilities cannot reach all portions of a vessel to fill such tanks. Thus, it is often necessary for vessels to be turned around at the dock to complete loading of both sides of a vessel. In fact, vessels may be turned around several times during loading in order to prevent listing as each side is loaded.

An important object of the present invention is to provide a bulk grain trimming apparatus particularly useful for loading vessels rapidly and efficiently with a minimum of voids and unwanted discontinuities in the surfaces of piles formed.

Another object of the present invention is to provide an apparatus in accordance with the preceding apparatus which is portable and can be easily transported and used in a series of different locations.

Still another object of this invention is to provide an apparatus in accordance with the preceding objects which can be used for removing unwanted materials from predetermined relatively inaccessible locations.

According to the invention, a portable trimming machine for handling bulk grain has a hopper defining at least two outlets substantially at the bottom thereof. A support mounts the hopper in an upright position with an elongated conduit connected to each of the outlets. Each conduit has a plurality of venturi means located at spaced intervals therealong. The venturi means of each conduit are interconnected with a gas pressure supply line to create a forward force on grain passing through the conduits. Means are provided for passing the gas under pressure into the gas supply lines to cause flow of the bulk grain through the conduits. Preferably the conduits are flexible and carry nozzles to permit rapid trimming of bulk grain piles and rapid repositioning of the apparatus to a variety of locations.

The above and other objects, features and advantages of the present invention will be better understood from the following description when read in connection with the accompanying drawings, in which.

Figure 1:
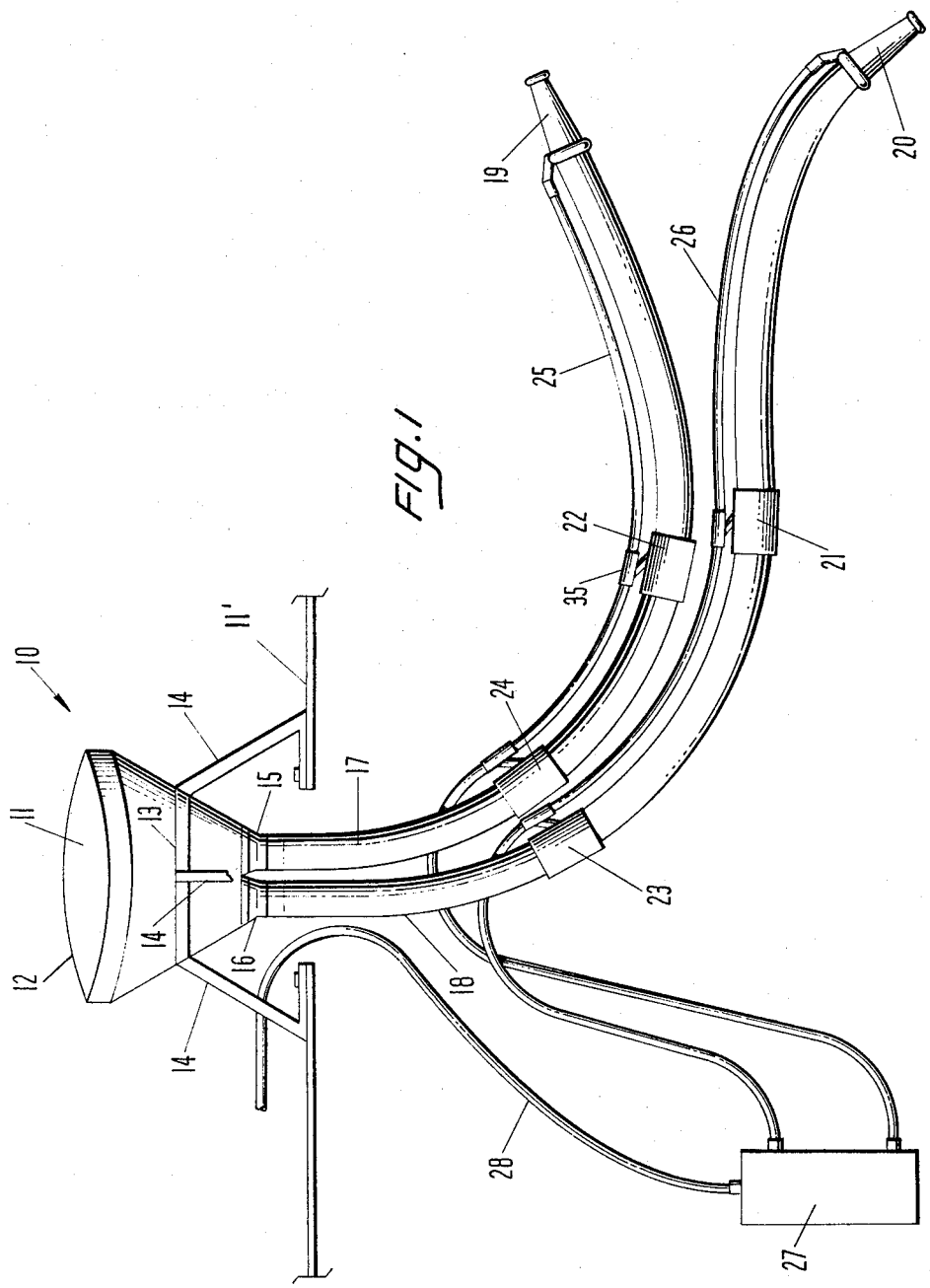
FIG. 1 is a front perspective view of a preferred embodiment of a portable trimming machine in accordance with the present invention.

Turning now to FIG. 1 of the drawing, a portable trimming machine for handling bulk grain is indicated generally at 10 mounted on the deck of a typical tanker vessel 11'. The trimming machine 10 comprises a hopper 11 preferably of generally conical configuration and adapted to receive grain such as wheat, barley, oats or any other bulk cargo such as flour from a bulk loading apparatus through its open top 12. The hopper 11 is supported by a stand comprising a hoop 13 supported by four legs 14 preferably spaced equally about the periphery of the band 13. The stand or support can be mounted on wheels if desired. Preferably, the hopper is removably held in the hoop 13 merely by its weight and the weight of the bulk grains carried therein so that it can be easily removed from the stand if desired.

At the bottom portion of the hopper 11 are two circular outlets 15 and 16 preferably of identical size and adapted to have flexible conduits 17 and 18 removably engaged therewith as by conventional quick disconnect fittings. The conduits 17 and 18 of the preferred embodiment are broken into three sections each having nozzles 19 and 20 with two intermediate identical venturi fittings 21, 22, 23 and 24 in each. The forward end of each nozzle as shown in FIG. 1 is fitted with a venturi fitting. All of the venturi fittings of each conduit 17 and 18 are interconnected by air hoses 25 and 26 which are connected at their ends with a manifold 27 in turn interconnected with an air compressor through line 28. The manifold 27 can be located adjacent the bottom of the hopper 11 or can be located with the compressor (not shown) above the deck of the ship 11'. In some cases, the gas compressor because of its size is preferably left on the dock while the manifold and apparatus 10 is actually mounted on the ship for movement from one cargo hold to another as desired.

Figure 2:
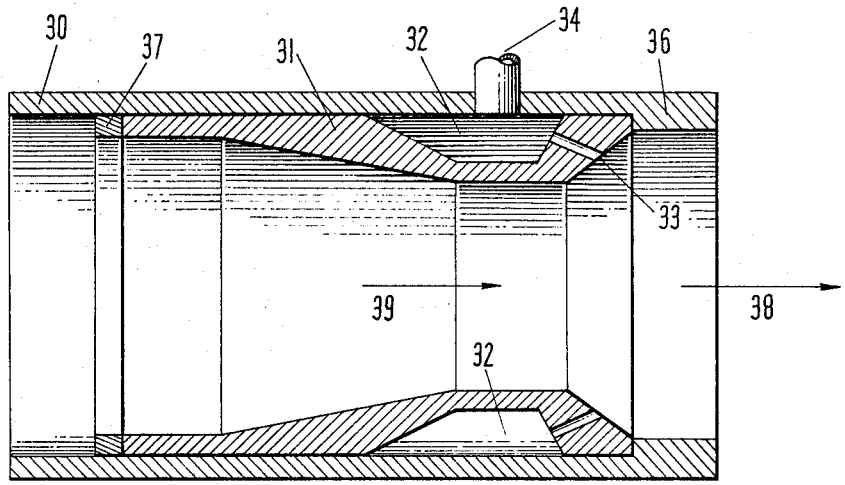
FIG. 2 is a center cross sectional view showing a venturi fitting thereof.

Each of the venturi fittings 21–24 are preferably identical and as best shown in FIG. 2 comprise a metallic ring 30 having a venturi insert 31 defining a circular passageway 32 and orifices 33 preferably having their central axes located at approximately a 15° angle from the central axis of the ring 30. An air inlet 34 is provided for interconnection with a gas supply line such as 25 by conventional T-connectors such as 35. The venturi ring 31 is preferably locked in place within the fitting by an annular shoulder 36 at one end and a snubber ring 37 at the other end. Quick disconnect fittings for the conduit means are preferably provided at either end of the ring 30 in a conventional manner. Air under pressure from the gas supply tubes pass around the annular passageway 32 and out through a series of at least four venturi holes 33 creating a pressure area as indicated by the arrow 38 and a vacuum area as indicated by the arrow 39 thereby helping to push grain in the direction of the arrows through the conduit means. In addition to the push-pull effect of the venturi, the weight of the bulk grain in the hopper also adds a force tending to move the grain along the conduit and out through the nozzle ends thereof. The venturi fittings forming nozzles 19 and 20 are substantially the same as fittings 21–24 but have their forward ends in the shape of a nozzle as shown.

In a specific embodiment of the apparatus 10 suitable for use on a variety of grain handling vessels, the hopper 11 has a volume of approximately 40 cubic feet, conduits 17 and 18 have a diameter of approximately 3 inches and each section thereof has a length of approximately 10 feet. The air pressure of 120 pounds per square inch is used in the lines 25 and 26 with the venturi passageways 33 having a diameter of approximately 2¼ inches. Bulk grains such as wheat can be passed rapidly through the system and distributed simultaneously into tanks on either side of the central wall of a vessel to rapidly trim the tanks while maintaining them at substantially the same levels thereby preventing listing of the vessel. The nozzles 19, 20 can be directed by hand to fill all voids in a cargo hold rapidly and efficiently.

Figure 3:
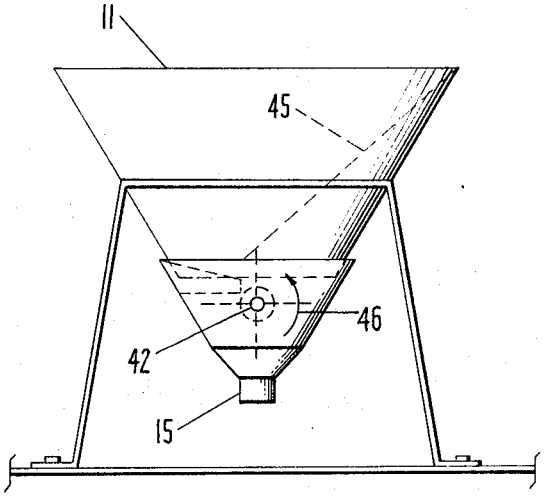
FIG. 3 is a front view of an alternate embodiment of the invention.
Figure 4:
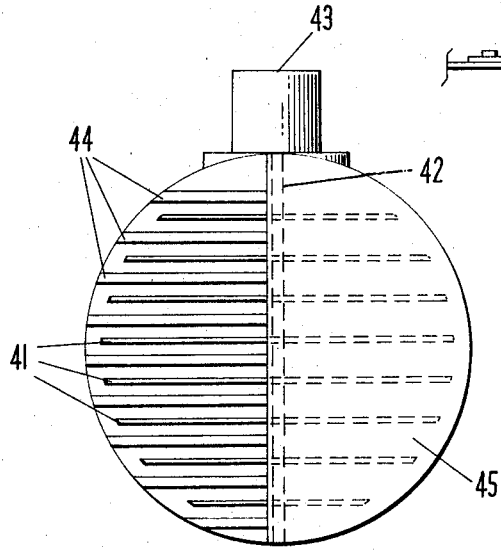
FIG. 4 is a top view of a portion thereof.

In an alternate embodiment of this invention, as shown in FIGS. 3 and 4, the hopper 11 is fitted with thresher means for breaking up cakes of grain or other materials which can then be fed by the conduits 17 and 18 to any desired location. This modification of the invention is desirable for use in cleaning cargo holds after grains have been stored in them. Thus, cakes of the grain are passed into the hopper 11, chopped up into small pieces and then fed though the outlets such as 15 (with only one outlet 15 being shown in the embodiment of FIG. 3) where they may be pumped by conduits 17 and 18 (as in the embodiment of FIG. 1) back through the top of the cargo hatch above the hopper 11 and out of the ship.

In this embodiment, the thresher comprises a plurality of fixed blades 44 vertically mounted on the sides of the conical funnel or hopper 11. A plurality of rotating blades 41 are provided intermeshed with blades 40 mounted on a central axle 42 which can be interconnected with an air or electrical motor at 43. One side of the threshing means is covered by an upwardly extending removable baffle 45 which prevents throwing of the grain threshed in the machine out of the top of the hopper as when the blades 41 are rotating in the direction of the arrows 46. The baffle 45 is provided with suitable apertures to allow passage of blades 41 during rotation thereof.

As can readily be seen from FIGS. 3 and 4 of the drawings when blades 41 are rotated about the axis of axle 42, cakes of grain or other materials positioned within the hopper 11 will be broken up and pulled downwardly by gravity out of the outlet 15 and into a conduit of the type described above having venturi fittings therein. The threshed material can then be removed from the hold of a ship or other places where desired and pumped by the venturi fittings over the side of the ship or elsewhere.

The specific embodiment of FIGS. 3 and 4 can also be used in trimming bulk grain piles or for other uses where slight caking may occur in the material placed within the hopper. Only a single outlet 15 can be used or alternately two or more outlets can be used.

While specific embodiments of this invention have been shown and described, it should be understood that many variations thereof are possible. For example the specific shape of the hopper can vary as can the particular supporting stand used. Various dimensions and values can be used for the components of the apparatus including the hopper, air lines and air pressure depending on the amount of bulk cargo handled and the distance of travel necessary. The invention is particularly useful with the many vessels which do not have lifting equipment where previously known methods other than hand trimming cannot be used. The number of segments in each conduit can vary as can the number of outlets and attached conduits. In some cases the portable trimming means of this invention can be use to load transportation means other than ships such as railroad cars. The device is particularly useful with railroad cars.

In view of the various modifications possible, this invention is to be limited only by the spirit and scope of the following claims.

What is claimed is:
1. A portable trimming machine for handling bulk grain in shipboard use comprising,
   a hopper defining outlet means substantially at the bottom thereof,
   a support removably mounting said hopper,
   a plurality of elongated flexible conduits connected to said outlet means,
   said conduits each being interconnected by a plurality of venturi means located at spaced intervals therealong,
   each of said venturi means of said conduits being interconnected with gas pressure supply lines to create a force on bulk grains passing through said conduits,
   each of said venturi means comprising a cylindrical ferrule having an elongated hollow metal ring mounted therein defining a venturi passageway smaller than the passageway of said conduit,
   said ring passageway having a plurality of venturi openings leading thereto whereby air can be passed out of said venturi openings beyond said ring passageway to create a forward moving pressure on bulk materials passing through said conduits,
   and a compressor for passing gas under pressure into said gas supply lines with said compressor being connected with said gas supply lines through a manifold and being independent of and spaced from said hopper.

2. A portable trimming machine in accordance with claim 1 wherein said hopper is generally conical and is removably mounted on a ring-shaped support.

3. A portable trimming machine in accordance with claim 1 and further comprising a thresher means having a first plurality of fixed blades and a second plurality of rotatable blades extending into said hopper.

4. A portable trimming machine in accordance with claim 3 wherein said rotatable blades are mounted for movement in a substantially vertical plane.

References Cited

UNITED STATES PATENTS

| | | | |
|---|---|---|---|
| 424,638 | 4/1890 | Barclay et al. | 302—28 |
| 843,806 | 2/1907 | Groves | 302—28 |
| 1,202,088 | 10/1916 | Murray | 302—24 |
| 1,462,786 | 7/1923 | Cleveland | 302—56 |
| 1,819,346 | 8/1931 | Tolman | 302—25 |

ANDRES H. NIELSEN, *Primary Examiner.*